United States Patent
Bellegarde

[11] Patent Number: 5,985,398
[45] Date of Patent: Nov. 16, 1999

[54] STAIRTREAD MADE OF A COMBINATION OF HIGHER QUALITY WOOD AND LOWER QUALITY MATERIAL

[75] Inventor: René Bellegarde, Stratford, Canada

[73] Assignee: Manufacture de Lambton LTÉE, Lambton, Canada

[21] Appl. No.: 09/143,080

[22] Filed: Aug. 28, 1998

Related U.S. Application Data

[63] Continuation of application No. 08/364,251, Dec. 27, 1994, abandoned.

[51] Int. Cl.$^6$ ................................ B32B 3/08; B32B 3/10
[52] U.S. Cl. .................................. 428/54; 52/177; 52/179
[58] Field of Search .......................... 52/177, 179; 428/54

[56] References Cited

U.S. PATENT DOCUMENTS

| | | |
|---|---|---|
| 1,638,262 | 8/1927 | Herzog . |
| 1,778,333 | 10/1930 | Neumann ................................ 428/54 |
| 2,018,712 | 10/1935 | Elmendorf . |
| 2,572,772 | 10/1951 | Skoog . |
| 2,942,635 | 6/1960 | Horne . |
| 3,730,820 | 5/1973 | Fields et al. . |
| 3,922,453 | 11/1975 | Seery . |
| 3,947,012 | 3/1976 | Cobb . |
| 3,969,558 | 7/1976 | Sadashige . |
| 3,970,497 | 7/1976 | Glover et al. . |
| 4,210,692 | 7/1980 | Bohme et al. . |
| 4,345,630 | 8/1982 | Bockwinkel et al. . |
| 4,535,019 | 8/1985 | Coronado . |
| 5,002,105 | 3/1991 | Bodig . |
| 5,050,653 | 9/1991 | Brown . |
| 5,059,472 | 10/1991 | Le Bell et al. . |
| 5,098,762 | 3/1992 | Nakajima . |
| 5,109,898 | 5/1992 | Schacht . |
| 5,283,102 | 2/1994 | Sweet et al. . |
| 5,320,152 | 6/1994 | Ganley . |
| 5,332,461 | 7/1994 | Huesler . |

FOREIGN PATENT DOCUMENTS

| | | |
|---|---|---|
| 135520 | 11/1933 | Austria . |
| 62583 | 3/1989 | Canada . |
| 120500 | 12/1947 | Sweden . |

OTHER PUBLICATIONS

Definition of "Veneer", Webster's New World Dict. Second College Ed., Dec. 1972.

*Primary Examiner*—Alexander Thomas
*Attorney, Agent, or Firm*—Akin, Gump, Strauss, Hauer & Feld, L.L.P.

[57] ABSTRACT

The stairtread has the aesthetic appearance of a solid hardwood stairtread and presents a structural stability comparable to that of hardwood treads, but comprises a core layer made of lamellas of lower quality material glued laterally adjacent to each other. On the top surface of the core layer are glued laterally adjacent to each other top lamellas of higher quality wood. Underneath lamellas made of higher quality wood may also be glued laterally adjacent to each other on the bottom surface of the core layer to form a tread of which the underside is made of higher quality wood covering the lower quality core. Finally an elongate nose member is applied and glued to a longitudinal edge surface of the core layer. Use of lower quality material such as low quality wood helps to preserve our natural resources and to reduce consumption of higher quality wood material becoming every day more rare and difficult to obtain.

9 Claims, 3 Drawing Sheets

STAIRTREAD MADE OF A COMBINATION OF HIGHER QUALITY WOOD AND LOWER QUALITY MATERIAL

CROSS-REFERENCE TO RELATED APPLICATION

This application is a continuation of application Ser. No. 08/364,251, filed Dec. 27, 1994, entitled "Stairtread Made of a Combination of Higher Quality Wood and Lower Quality Material", abandoned.

BACKGROUND OF THE INVENTION

1. Field of the Invention

The present invention relates to a stairtread comprising a core layer made of lower quality material, in particular but not exclusively lower quality hardwood, and a top layer and nose member made of higher quality wood.

2. Brief Description of the Prior Art

Conventional wooden stairtreads are made of elongate wooden lamellas each made of a single solid piece of higher quality wood, these elongate wooden lamellas being assembled, i.e. glued laterally adjacent to each other to form the tread. This structure has the drawback of requiring a large quantity of higher quality wood.

In the present disclosure and in the appended claims, the expression "higher quality wood" is intended to designate wood of sufficient quality to be used in making the elongate wooden lamellas of conventional wooden treads, while the expression "lower quality wood" relates to wood of insufficient quality and usually discarded upon manufacture of conventional wooden treads. Regarding the expression "lower quality material" it includes lower quality wood and secondary materials such as high density fiber materials.

OBJECTS OF THE INVENTION

An object of the present invention is therefore to provide a stairtread having the aesthetic appearance of a solid hardwood stairtread and presenting a structural stability comparable to that of conventional hardwood treads, but having a core layer composed of lower quality material, in particular but not exclusively lower quality hardwood usually disposed of. This helps to preserve our natural resources and to reduce consumption of higher quality wood material becoming every day more rare and difficult to obtain.

SUMMARY OF THE INVENTION

More specifically, in accordance with the present invention, there is provided a stairtread comprising an elongate nose member made of higher quality wood and having a first longitudinal edge surface and a second longitudinal edge surface which is rounded in cross section to form a tread's nose, and an elongate tread body comprising a core layer having a top face and a top layer having a bottom face applied and glued to the top face of the core layer. The core layer is made of a plurality of first elongate thicker lamellas made of lower quality material and glued laterally adjacent to each other, the top layer is made of a plurality of second elongate thinner lamellas made of higher quality wood and glued laterally adjacent to each other, the tread body comprises a longitudinal edge surface applied and glued to the first longitudinal edge surface of the nose member, and the top layer and nose member define higher quality wooden apparent top and nose surfaces of the stairtread.

Preferably, the first elongate thicker lamellas of the core layer are made of lower quality wood, at least one of the first elongate thicker lamellas of the core layer comprises a plurality of sections of lower quality wood assembled end to end, the elongate nose member and each second elongate thinner lamella of the top layer is made of a single solid piece of higher quality wood.

According to other preferred embodiments, the stairtread further comprises a bottom layer made of higher quality wood and having a top face applied and glued to the bottom face of the elongate tread body, and the bottom layer comprises a plurality of laterally adjacent thin elongate lamellas each cut in a single solid piece of higher quality wood.

Also in accordance with the present invention, there is provided a method of fabricating a stairtread, comprising the steps of:

making an elongate nose member made of higher quality wood and having a first longitudinal edge surface and a second longitudinal edge surface which is rounded in cross section to form a tread's nose;

making elongate thicker core lamellas of lower quality material;

making elongate top lamellas of higher quality wood having respective bottom faces;

gluing the elongate thicker core lamellas laterally adjacent to each other to form an elongate core layer of lower quality material having a top face;

assembling the elongate thinner top lamellas to form an elongate top layer of higher quality wood, the assembling step comprising gluing the elongate thinner top lamellas laterally adjacent to each other and gluing the bottom faces of the top lamellas to the top face of the core layer; and applying and gluing the first longitudinal edge surface of the nose member to a longitudinal edge surface of the core body.

Therefore, the top layer and nose member define higher quality wooden apparent top and nose surfaces of the stairtread.

The present invention further relates to a stairtread comprising a plurality of elongate members assembled laterally adjacent to each other, each of the elongate members comprising a core lamella made of lower quality material and having a top face. Each elongate member also comprises a top lamella made of higher quality wood and having a bottom face applied and glued to the top face of the core lamella. Also, each pair of laterally adjacent elongate members have respective edge surfaces applied and glued to each other, the top lamellas of the laterally adjacent elongate members define a higher quality wooden apparent top surface of the stairtread, and the core lamellas of the laterally adjacent elongate members define a lower quality, non apparent bottom surface of the stairtread.

According to another aspect of the subject invention, there is provided a method of fabricating a stairtread, comprising the steps of:

making elongate core lamellas of lower quality material having respective top faces;

making elongate top lamellas of higher quality wood having respective bottom faces;

applying and gluing the bottom faces of the top lamellas to the top faces of the core lamellas, respectively, to form elongate members; and assembling the elongate members laterally adjacent to each other, the assembling step comprising applying and gluing to each other respective edge surfaces of each pair of laterally adjacent elongate members;

wherein (a) the top lamellas of the laterally adjacent elongate members define a higher quality wooden apparent top surface of the stairtread, and (b) the core lamellas of the laterally adjacent elongate members define a lower quality non apparent bottom surface of the stairtread.

By using core layers made of lower quality wood, the stairtread structure in accordance with the present invention reduces the quantity of higher quality wood required to construct the stairtread, but does not affect the aesthetic appearance of that stairtread.

The objects, advantages and other features of the present invention will become more apparent upon reading of the following non restrictive description of preferred embodiments thereof, given by way of example only with reference to the accompanying drawings.

DETAILED DESCRIPTION OF THE PREFERRED EMBODIMENT

Figure 1:
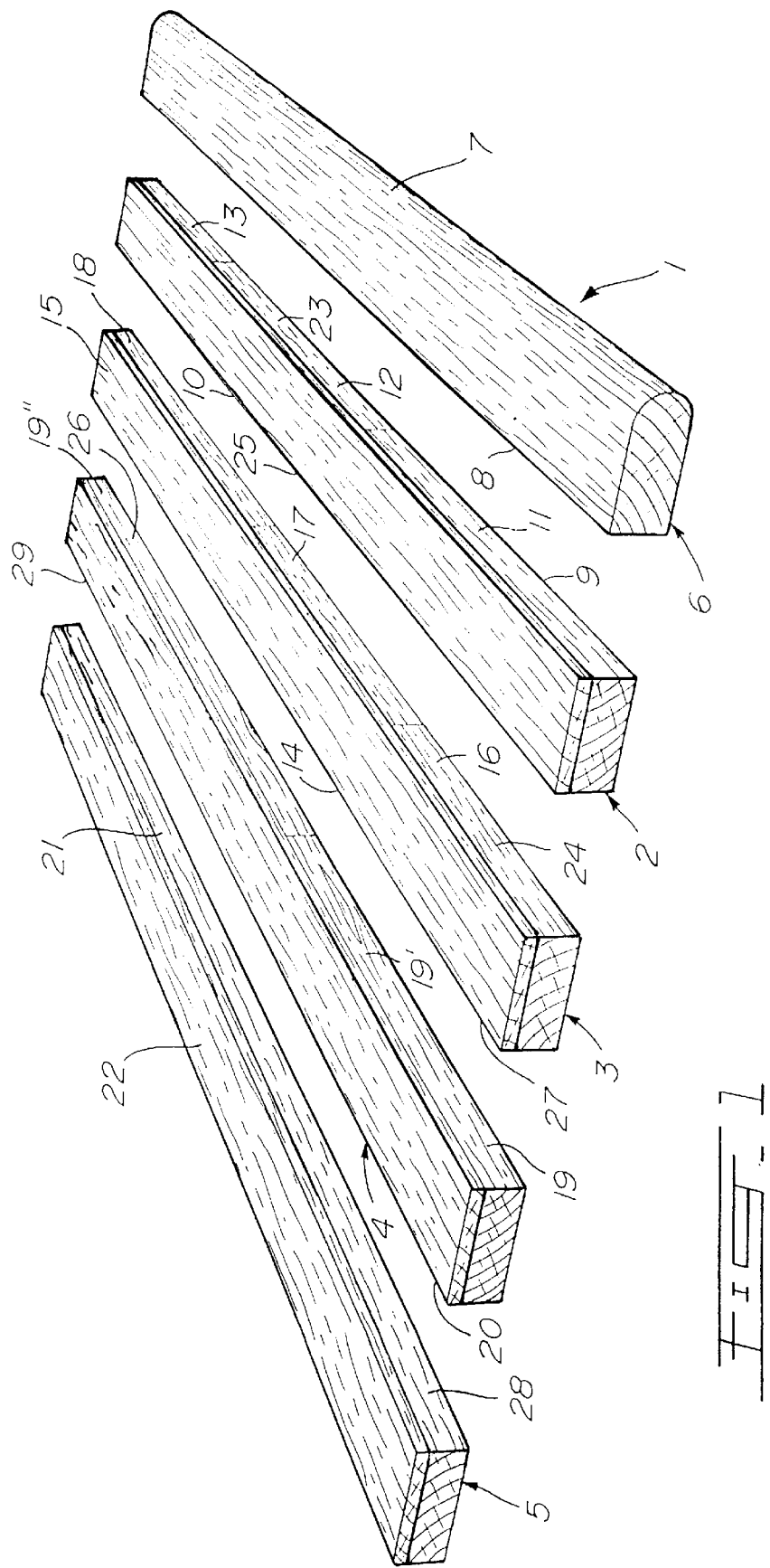
FIG. 1 is an exploded, perspective view of a preferred embodiment of a wooden stairtread in accordance with the present invention.
Figure 2:
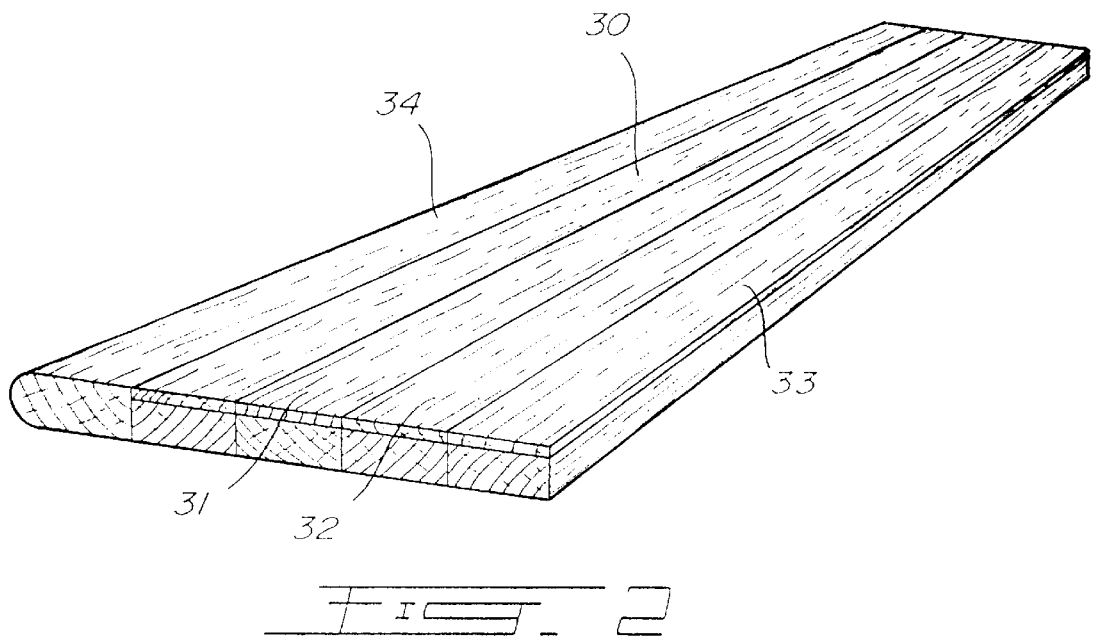
FIG. 2 is a top, rear perspective view of the wooden stairtread of FIG. 1.
Figure 3:
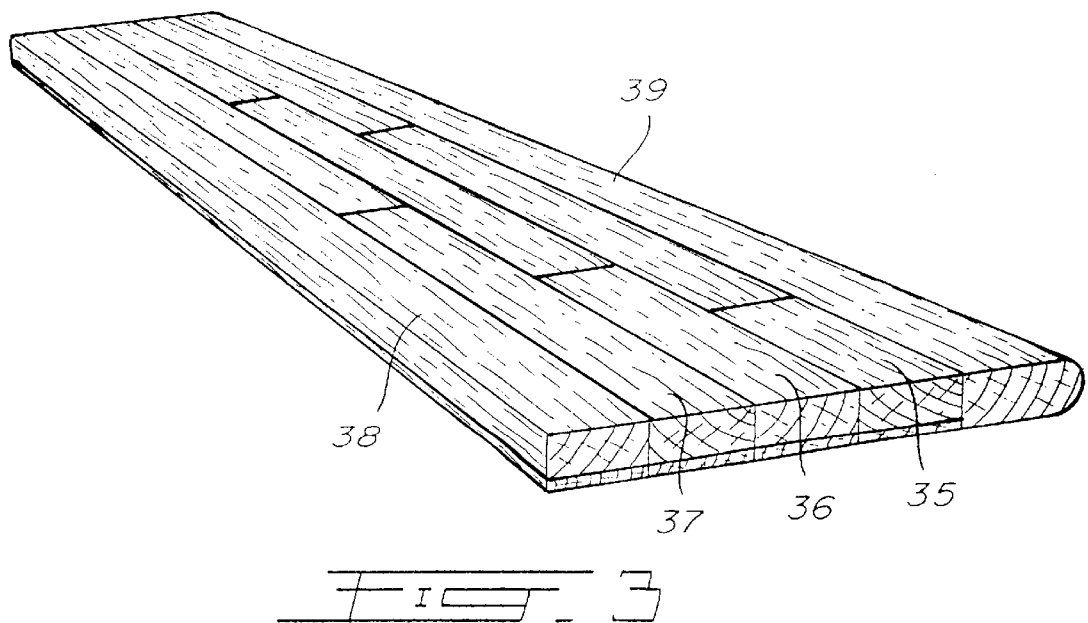
FIG. 3 is a bottom, rear perspective view of the wooden stairtread of FIGS. 1 and 2.
Figure 4A:
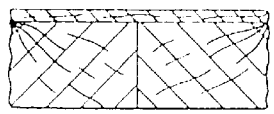
FIG. 4a is a longitudinal, cross sectional view showing a butt joint for assembling end to end sections of lower quality wood and thereby form an elongate wooden lamella usable in the construction of the stairtread of FIGS. 1–3.
Figure 4B:
FIG. 4b is a longitudinal, cross sectional view showing a triangular double-notch joint for assembling end to end sections of lower quality wood and thereby form an elongate wooden lamella usable in the construction of the stairtread of FIGS. 1–3.
Figure 4C:
FIG. 4c is a longitudinal, cross sectional view showing a halved joint for assembling end to end sections of lower quality wood and thereby form an elongate wooden lamella usable in the construction of the stairtread of FIGS. 1–3.
Figure 4D:
FIG. 4d is a longitudinal, cross sectional view showing a tongue and groove joint for assembling end to end sections of lower quality wood and thereby form an elongate wooden lamella usable in the construction of the stairtread of FIGS. 1–3.
Figure 4E:
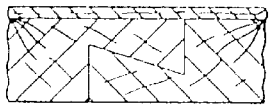
FIG. 4e is a longitudinal, cross sectional view showing a dovetail halved joint for assembling end to end sections of lower quality wood and thereby form an elongate wooden lamella usable in the construction of the stairtread of FIGS. 1–3.

The preferred embodiment of the wooden stairtread in accordance with the present invention illustrated in FIGS. 1–3 is generally identified by the reference 1.

In the embodiment of FIGS. 1–3, the wooden stairtread 1 comprises four elongate wooden members (lamellas) 2, 3, 4 and 5, and an elongate longitudinal nose member 6, each having a length corresponding to the length of the stairtread 1.

The nose member 6 is cut into a single solid piece of higher quality wood and comprises a longitudinal edge surface 7 which is rounded in cross section to form the nose of the stairtread. The nose member 6 comprises another generally flat longitudinal edge surface 8.

The wooden members 2, 3, 4 and 5 are rectangular in cross section to be assembled laterally adjacent to each other as will be described hereinafter.

More specifically, wooden member 2 is formed of a core lamella 9 made of lower quality wood, and of a top lamella 10 made of higher quality wood and having a bottom face applied and glued to the top face of the core lamella 9. In the example of FIGS. 1, 2 and 3, the core lamella 9 is made of three wood sections 11, 12 and 13 assembled (glued or not) end to end. Regarding the top lamella 10, it is cut into a single solid piece of higher quality wood. As shown, the core lamella 9 made of lower quality wood is well thicker than the top lamella 10 made of higher quality wood.

Wooden member 3 is formed of a core lamella 14 made of lower quality wood, and of a top lamella 15 made of higher quality wood and having a bottom face applied and glued to the top face of the core lamella 14. In the example of FIGS. 1, 2 and 3, the core lamella 14 is made of three wood sections 16, 17 and 18 assembled (glued or not) end to end. Regarding the top lamella 15, it is cut into a single solid piece of higher quality wood. Again, the core lamella 14 made of lower quality wood is well thicker than the top lamella 15 made of higher quality wood.

Wooden member 4 is formed of a core lamella 19 made of lower quality wood, and of a top lamella 20 made of higher quality wood and having a bottom face applied and glued to the top face of the core lamella 19. In the example of FIGS. 1, 2 and 3, the core lamella 19 is made of two wood sections 19' and 19" assembled (glued or not) end to end. Regarding the top lamella 20, it is cut into a single solid piece of higher quality wood. As shown, the core lamella 19 is well thicker than the top lamella 20.

Outer wooden member 5 is formed of a core lamella 21 made of lower quality wood, and of a top lamella 22 made of higher quality wood and having a bottom face applied and glued to the top face of the core lamella 21. In the example of FIGS. 1, 2 and 3, the core lamella 21 is cut into single solid piece of lower quality wood. Tests have demonstrated that providing the outer wooden member 5 with a solid core lamella 21 strengthens the stairtread 1. Regarding the top lamella 22, it is cut into a single solid piece of higher quality wood. As shown, the core lamella 21 is well thicker than the top lamella 22.

Wooden member 2 comprises a first generally flat longitudinal edge surface 23 applied and glued to the generally flat edge surface 8 of the nose member 6, wooden member 3 comprises a first generally flat longitudinal edge surface 24 applied and glued to a second generally flat edge surface 25 of wooden member 2, wooden member 4 comprises a first generally flat longitudinal edge surface 26 applied and glued to a second generally flat edge surface 27 of wooden member 3, and wooden member 5 comprises a generally flat longitudinal edge surface 28 applied and glued to a second generally flat edge surface 29 of wooden member 4.

The wooden members 2, 3, 4 and 5 and the nose member 6 are therefore assembled laterally adjacent to each other to form the stairtread 1 of FIGS. 1–3. As shown in FIG. 2, the outer top surfaces 30, 31, 32 and 33 of the top lamellas 10, 15, 20 and 22 of the wooden members 2, 3, 4 and 5, and the outer top surface 34 of the nose member 6 define a higher quality wooden apparent top surface of the stairtread 1. As illustrated in FIG. 3, the outer bottom surfaces 35, 36, 37 and 38 of the core lamellas 9, 14, 19 and 21 of the wooden members 2, 3, 4 and 5 define a lower quality wooden, non apparent bottom surface of the stairtread 1. The outer bottom surface 39 of the nose member 6 defines a higher quality wooden apparent front bottom surface of the stairtread 1. Finally, as mentioned in the foregoing description, the rounded longitudinal edge surface 7 of member 6 forms a higher quality wooden apparent nose surface of the stairtread 1.

As the core lamellas 9, 14, 19 and 21 are made of lower quality wood normally disposed of, and since the top lamellas 10, 15, 20 and 22 are thin, the quantity of higher quality wood required to fabricate the stairtread 1 in accordance with the present invention is greatly reduced. For these two reasons, the stairtread in accordance with the present invention saves wood, but without affecting the aesthetic appearance of the stairtread or the stability of the staircase.

FIGS. 4a–4e are longitudinal, cross sectional views showing different joints, glued or not, and usable to assemble end to end the wood sections forming the core lamellas 9, 14 and 19. For example, butt joints (FIG. 4a), triangular double-notch joints (FIG. 4b), halved joints (FIG. 4c), tongue and groove joints (FIG. 4d) and dovetail halved joints (FIG. 4e) can be used.

Figure 5:
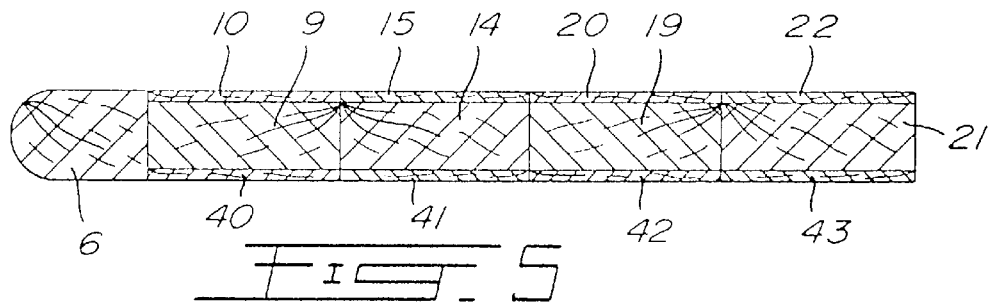
FIG. 5 is an elevational end view of a second preferred embodiment of the wooden stairtread in accordance with the present invention.

FIG. 5 shows the bottom surfaces of the core lamellas 9, 14, 19 and 21 covered with respective additional lamellas 40, 41, 42 and 43 of higher quality wood. The advantage of the structure of FIG. 5 is that the top and bottom surfaces of the tread are both made of higher quality wood.

Figure 6:
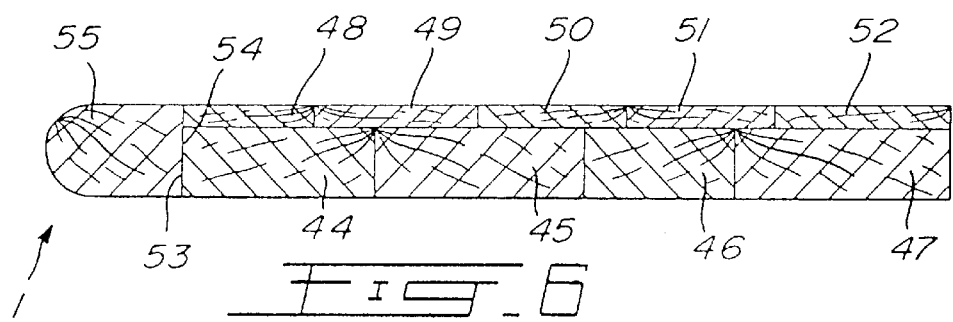
FIG. 6 is an elevational end view of a third preferred embodiment of the wooden stairtread in accordance with the present invention.

In the embodiment of FIG. 6, the stairtread 1 comprises an elongate tread body comprising a core layer made of lamellas 44–47, of lower quality wood and of which the width may vary. To the top surface of the core layer are applied and glued top lamellas 48–52 of higher quality wood to form a top layer. The core lamellas 44–47 are glued laterally adjacent to each other. In the same manner, the top lamellas 48–52 are glued laterally adjacent to each other. The width of the top lamellas 48–52 may vary with respect to each other and with respect to the width of the core lamellas 44–47. The number of top 48–52 and core 44–47 lamellas may also vary. Finally, the elongate tread body comprises a longitudinal edge surface 53 applied and glued to a flat edge surface 54 of an elongate, longitudinal nose member 55 cut into a single solid piece of higher quality wood.

Preferably, the higher quality wood and lower quality wood used to fabricate a stairtread according to the invention will be of the same species. However, it is within the scope of the present invention to use higher and lower quality wood materials of different species.

It is also within the scope of the present invention to use lower quality materials other than low quality hardwood to fabricate the core lamellas 9, 14, 19, 21 and 44–47. For example, high density fiber material can be envisaged.

Tests have demonstrated that a stairtread according to FIGS. 1–3 is 65% to 70% as solid as a conventional wooden stairtread made of elongate solid hardwood lamellas glued laterally adjacent to each other.

Although the present invention has been described hereinabove by way of a preferred embodiment thereof, this embodiment can be modified at will, within the scope of the appended claims, without departing from the spirit and nature of the subject invention.

What is claimed is:

1. In a stairtread having a length, height and depth, an improvement comprising:

an elongate nose member made of a single, unbroken, solid piece of higher quality wood extending the full height and full length of the stairtread, the elongate nose member having a first longitudinal edge surface and a second longitudinal edge surface which opposes the first edge surface and is rounded in cross section to form a tread's nose; and an elongate tread body comprising a core layer having a top face, a top layer having a bottom face applied and glued to the top face of the core layer, and a longitudinal edge surface applied and glued to the first longitudinal edge surface of the nose member;

wherein
  (a) the core layer is made of a plurality of first elongate thicker lamellas made of lower quality material and glued laterally adjacent to each other,
  (b) the top layer is made of a plurality of second elongate thinner, single, unbroken lamellas made of higher quality wood extending the full length of the stairtread and glued laterally adjacent to each other,
  (c) the first elongate thicker lamellas include one thicker lamella most remote from the nose member which is one, single, unbroken piece of the lower quality material, extending the full length of the stairtread, and
  (d) the top layer and nose member define a continuous higher quality wooden apparent top and nose surface of the stairtread.

2. The stairtread of claim 1, wherein at least one more of the first elongate thicker lamellas of the core layer is a single unbroken, piece of the lower quality material extending the full length of the tread.

3. The stairtread of claim 1, wherein the first elongate thicker lamellas of the core layer are wood.

4. The stairtread of claim 1 consisting essentially of joined together hardwood pieces and wherein at least one of the first lamellas of the core layer is of hardwood material and has a break along its length, end surfaces of the at least one broken lamella facing each other at the break being unconnected to one another.

5. The stairtread of claim 4, wherein the at least one broken first lamella of the core layer has a plurality of breaks along its length.

6. The stairtread of claim 1, wherein at least one of the first lamellas of the core layer is less solid than any of the second lamellas of the top layer.

7. The stairtread of claim 1, wherein the core layer is less solid than the top layer.

8. The stairtread of claim 1 consisting essentially of hardwood of the same species.

9. The stairtread of claim 1, wherein the core layer has a bottom face and wherein the elongate tread body further comprises a bottom layer having a top face applied and glued to a bottom face of the core layer, the bottom layer being made of a third plurality of thinner, single unbroken lamellas made of higher quality hardwood extending the full length of the stairtread and glued laterally adjacent to each other.

* * * * *